United States Patent [19]

Uken et al.

[11] Patent Number: 5,037,170
[45] Date of Patent: Aug. 6, 1991

[54] OPTICAL FIBER TAP UTILIZING REFLECTOR AND RESILIENT CLOSURE

[75] Inventors: William D. Uken, Fremont; Thomas D. Ratzlaff, Menlo Park, both of Calif.

[73] Assignee: Raynet Corp., Menlo Park, Calif.

[21] Appl. No.: 347,356

[22] Filed: May 4, 1989

Related U.S. Application Data

[63] Continuation-in-part of Ser. No. 213,642, Jun. 30, 1988, abandoned, which is a continuation-in-part of Ser. No. 144,898, Jan. 15, 1988, Pat. No. 4,824,199, which is a continuation of Ser. No. 14,890, Feb. 13, 1987, Pat. No. 4,741,585.

[51] Int. Cl.$^5$ .............................................. G02B 6/26
[52] U.S. Cl. ......................................... 385/32; 385/48
[58] Field of Search ................ 350/96.15, 96.16, 96.20, 350/96.21, 96.22

[56] References Cited

U.S. PATENT DOCUMENTS

| | | | |
|---|---|---|---|
| 4,741,585 | 5/1988 | Uken | 350/96.15 |
| 4,747,652 | 5/1988 | Campbell et al. | 350/96.15 |
| 4,759,605 | 7/1988 | Shen et al. | 350/96.15 |
| 4,792,202 | 12/1988 | Zucker et al. | 350/96.16 |
| 4,824,199 | 4/1989 | Uken | 350/96.15 |
| 4,834,482 | 5/1989 | Campbell et al. | 350/96.15 |
| 4,889,403 | 12/1989 | Zucker et al. | 350/96.15 |

FOREIGN PATENT DOCUMENTS 61-258205 11/1986 Japan .
2158607 5/1984 United Kingdom .

OTHER PUBLICATIONS

Patent Abstracts of Japan, vol. 17, No. 109 (P-564) (2556), & Apr. 1987 & JP, A, 61258205 (Furukawa Electric Co. Ltd: The); Nov. 15, 1986.

*Primary Examiner*—Frank Gonzalez
*Attorney, Agent, or Firm*—Dennis E. Kovach

[57] ABSTRACT

A tap for coupling light from an intermediate portion of an optical fiber core and a light element by passing light through a side of the optical fiber includes an optical coupler in contact with an outside surface of an optical fiber which is bent and disposed in a plane. A light reflector extending transverse to the plane deflects the withdrawn light towards the end surface of a light element disposed completely outside the plane. The tap may be used as a read tap to withdraw light, or as a write tap to inject light in optical fiber networks. A spring biased closure member urges the optical fiber to maintained in bent registration with the optical coupler within the plane. Simple tools and general craft training and knowledge may be applied to insert into, and remove the optical fiber from, the tap.

13 Claims, 7 Drawing Sheets

OPTICAL FIBER TAP UTILIZING REFLECTOR AND RESILIENT CLOSURE

CROSS-REFERENCES TO RELATED APPLICATIONS

The present application is a continuation-in-part of U.S. patent application Ser. No. 213,642 filed Jun. 30, 1988 and now abandoned which is a continuation-in-part of U.S. patent application Ser. No. 144,898, filed on Jan. 15, 1988 (and now U.S. Pat. No. 4,824,199), which is a continuation of U.S. application Ser. No. 14,890 filed Feb. 13, 1987, now U.S. Pat. No. 4,741,585, the disclosures of which are incorporated hereby by reference.

The '585 patent and '898 application disclose and claim improved optical fiber taps wherein light is deflected between a light element and an optical fiber intermediate section such that a light path of the light between the light element and the light deflector or reflector travels along a line outside of a plane defined by the bent fiber intermediate section. That application also discloses and claims the concept of resiliently loading the fiber with a spring force, these inventions being the sole invention of William David Uken. The present application claims specific preferred embodiments of a spring loading structure for maintaining the fiber resiliently urged, and constitute further improvements over those disclosed in the '642 application, these further embodiments constituting the joint invention of William David Uken and Thomas D. Ratzlaff.

FIELD OF THE INVENTION

The present invention relates to an optical fiber tap utilizing a deflector and including a spring loaded closure member, methods for making same, and networks usable therewith.

BACKGROUND OF THE INVENTION

Numerous methods have been proposed in the prior art for distributing information using an optical fiber, preferred methods including star, ring and bus architectural networks. Generally speaking, star and ring networks utilize point-to-point connections, whereas bus networks are capable of utilizing non-point-to-point connections whereby an optical signal is only partially interrupted by any one connection.

For example, Polcyzynski, U.S. Pat. No. 4,089,584 discloses a bus network which utilizes an optical fiber having a rectangular core and cladding, and connection or tapping of the fiber is accomplished by removing the cladding and disposing a prism or grading against an exposed rectangular core. Such networks are disadvantageous, since the fiber and taps usable therewith are relatively complex in design and hence unduly expensive, and optical network performance is rather poor in view of relatively low tapping efficiencies that result using such methods.

Miller, United Kingdom Patent document No. 2,126,749B and an article by Dakin et al. entitled "Experimental Studies into the Non-Invasive Collection and Distribution of Data on a Fiber-Optic Monomode Bus" propose designing a read optical fiber bus using taps whereby light is withdrawn through a side of the optical fiber by passing the light through a coating of the fiber. Miller collects the light from the bus fiber by disposing a photodetector at an end of a curved and grooved light pipe disposed around the bus fiber, and Dakin et al. collects the light by tightly pressing a polymeric fiber with part of its cladding removed against a curved portion of the bus fiber. Such techniques are also disadvantageous in that again the taps are complicated in design, require special technician/craft skills and are craft sensitive to install in the field, and are not sufficiently efficient when tight flux budgets are mandated by network design.

Goell et al., U.S. Pat. No. 3,982,123 at FIGS. 5A and 5B disclose an optical fiber read tap whereby an exposed glass cladding of a bent optical fiber portion is glued to a top of a photodetector. Such taps are disadvantageous since a strength of the fiber is disadvantageously affected by removal of its outer protective buffer, and rather small coupling light efficiencies are obtained by simply using epoxy to secure a bent optical fiber onto a top surface of a photodetector. In addition, the optical fiber is not releaseable from the tap.

Cross, U.S. Pat. No. 4,270,839 discloses a tap for an optical fiber whereby the fiber is bent in air, and downstream from the bent portion of the optical fiber a straight section of the optical fiber is glued within a straight light pipe which thereafter is curved and has a light detector at a remote end thereof. Again, such taps are disadvantageous, since they have been found to yield relatively low light coupling efficiencies, and the optical fiber is not releaseable from the pipe once glued thereonto.

Campbell et al., U.S. Pat. No. 4,728,169; Campbell et al., U.S. patent application Ser. No. 754,035, filed on July 11, 1985; and Campbell et al., U.S. patent application Ser. No. 614,884, filed on May 25, 1984, all of which are assigned to the assignee of the present invention, the disclosures of which are all incorporated herein by reference, disclose several advantageous kinds of taps for injecting light into, or withdrawing light from, optical fibers. However, there continues to be a need for yet more efficient taps which are also mechanically simple in structure and reliably usable in the field without special craft skills or extensive training.

SUMMARY OF THE INVENTION WITH OBJECTS

Accordingly, it is an object of the present invention to overcome and eliminate the above-noted drawbacks and disadvantages of the prior art approaches and to provide an optical read tap and/or optical write tap and network usable therewith which operates more efficiently than heretofore described.

Another object of the present invention is to provide a more efficient optical fiber tap into and from which an optical fiber may be installed and removed by ordinarily skilled craftpersons without special tools, skills or training.

These and other objects are achieved by a tap which bends an optical fiber between first and second surfaces, e.g. a closure member and a groove surface, one of the members being moveable, with one of the members being resiliently urged against the optical fiber with a spring so as to maintain a resilient clamping force on the fiber which keeps an intermediate section of the optical fiber bent so as to allow light coupling therewith, for either light injection or light detection.

BRIEF DESCRIPTION OF THE PREFERRED EMBODIMENTS

A preferred embodiment includes a cammed closure mechanism which when open enables the optical fiber to be loaded into and unloaded from the tap without difficulty or damage, and when closed urges a spring against the movable closure member such that the optical fiber is resiliently urged against an optical coupler in proper alignment and registration therewith. The cammed closure is operable with a simple hand-held rotating tool and without special craft training.

Other preferred embodiments include a snap-action spring which is moved by use of a plunger so as to snap against a moveable closure member and resiliently urge the same against the optical fiber, alternatively a coil spring which is compressed against the closure member by utilizing a bayonet blocking pin, or alternatively a 2-position pivot member which rotates about a pivot point in conjunction with a tension spring applied thereto which preferentially urges the pivot member to either side of the pivot point so that when the pivot member is rotated towards the closure member the closure member is resiliently urged thereby.

The tap of the present invention is most suitable for use in a serial connection with an optical fiber for creating either a read bus or a write bus.

These and other objects, advantages, features and aspects of the present invention will be more fully understood and appreciated upon consideration of the following detailed description of preferred embodiments, presented in conjunction with the accompanying drawings.

DETAILED DESCRIPTION OF THE PREFERRED EMBODIMENT

Figure 1:
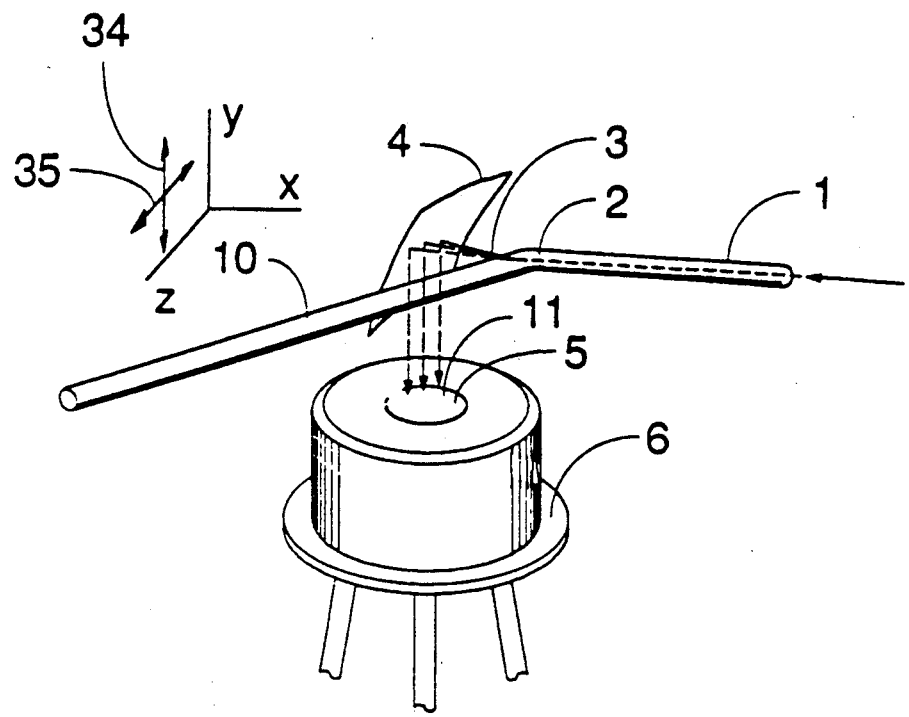
FIG. 1 illustrates a preferred embodiment of a tap embodiment incorporating a curved reflection surface.

Referring to FIG. 1, an optical fiber 1 has a portion 2 thereof bent about a radius of curvature sufficiently small so as to cause light 3 to leak or radiate therefrom. The light 3 is then deflected by deflector or reflector 4 towards a light collection end surface 5 which in this figure is part of a photodetector 6.

Generally, as used throughout herein the invention is described with reference to "a light element", and it should be hereinafter understood that the light element may constitute any one of a variety of apparatuses useful for detecting light withdrawn from an optical fiber; alternatively any one of a number of apparatuses for generating light for injection into an optical fiber; or simply a waveguide (e.g. pigtail optical fiber) connecting a light detector, light emitter, or further waveguide to the tap of the present invention.

Preferably the taps of the present invention are constructed so that light is withdrawn from a core of an optical fiber, as opposed to its cladding, and alternatively light is injected into a core of the optical fiber as opposed to being simply injected into a cladding of the optical fiber. According to preferred embodiments of the present invention, the light is injected or withdrawn by passing through one or more coatings of the fiber (e.g. buffers or jackets) and the cladding. Nothing expressed herein should be understood as suggesting that the practice of the present invention calls for or requires that either the buffer/jackets or the cladding be removed or peeled away from the fiber at the situs of the tap. Such prior procedures are made obsolete by the present invention.

Figure 2:
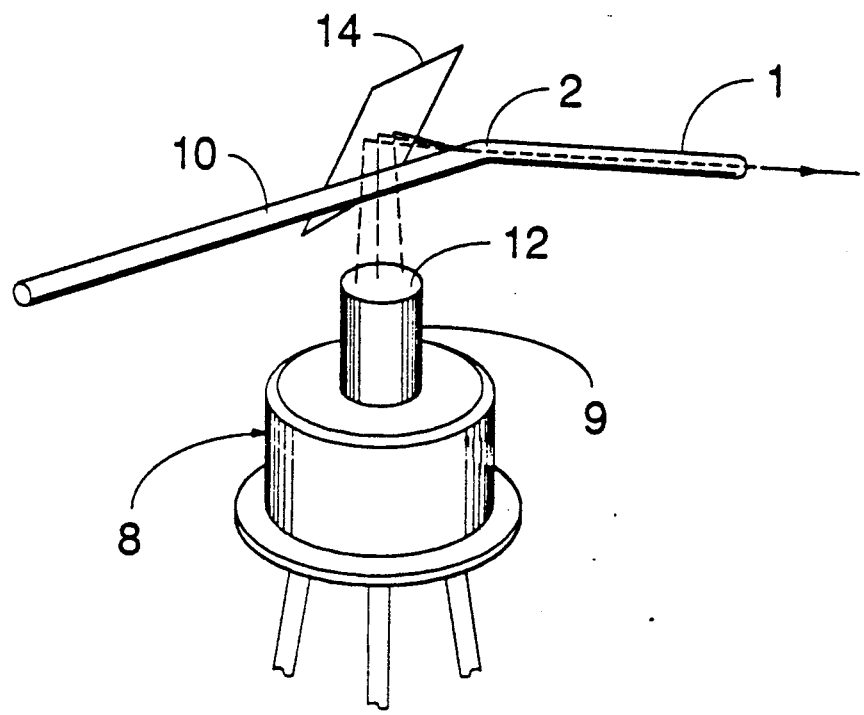
FIG. 2 illustrates a tap embodiment utilizing a planar reflection surface.

FIG. 2 illustrates a case where the light is injected into the optical fiber 1, and particularly its core, at the bend 2 using a reflection surface 14 which deflects light originating from a light source 8 after being focused by lens 9 so as to exit lens end surface 12. The lens 9 may comprise a pigtail optical fiber, or a specially formed waveguide. In both FIGS. 1 and 2 the reflection surface 4, 14 deflects the light between a core of a bent optical fiber portion 2 and a light element 5, 9.

Figure 3:
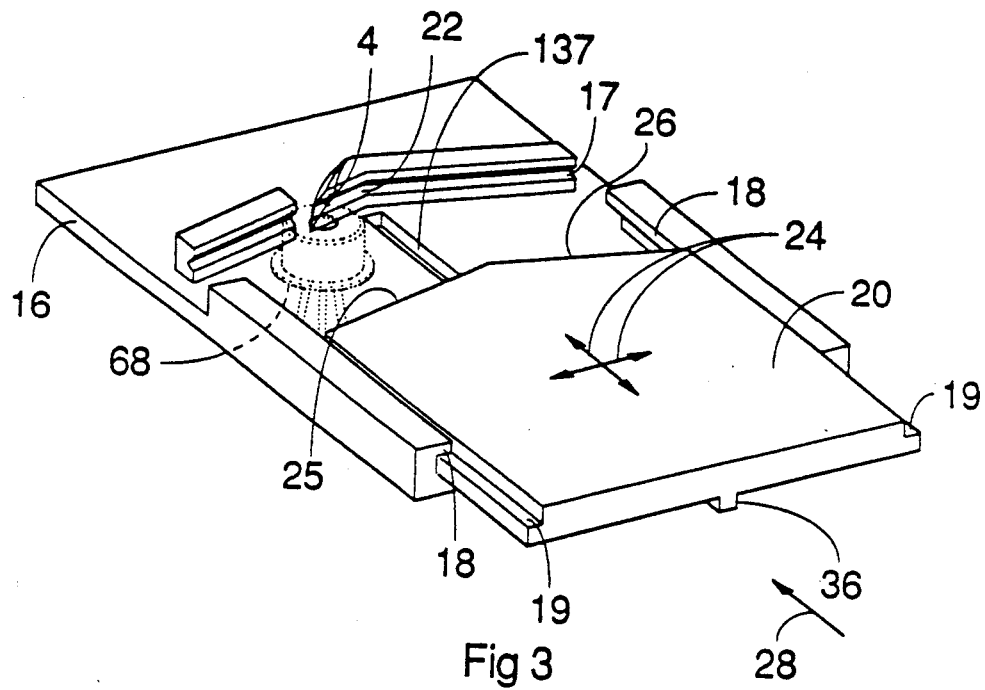
FIG. 3 illustrates another preferred embodiment which includes a closure member for releasably pressing the optical fiber so as to maintain a constant bend attitude therein.

FIG. 3 illustrates a geometry of a preferred tap embodiment which includes the concept of FIGS. 1 and 2 and whereby it is evident that in all cases a light element 6, 8, 68 has a respective end surface 11, 12, 13 which is disposed in a plane which is parallel with plane 24 and whose optical axis is not parallel to plane 24 (but is preferably normal or perpendicular to that plane), the plane including the bent optical fiber portion 2, as illustrated by the criss-crossing arrows 24 in FIG. 3.

In FIG. 3 a substrate 16 has formed thereon a groove 17 sized to accept an optical fiber 1 (not shown in FIG. 4) to be tapped, the groove 17 including a bent portion 22. The substrate 16 includes first and second flanges 18 which define first and second grooves 19 along which a closure member 20 can slide along in parallel in the plane 24 which includes therein the bent portion 22 and the bent optical fiber portion 2. An end face 25 of the closure member 20 has a profile 26 which is complementary with the curved profile of the groove 17 such that the optical fiber 1 may be securely maintained in a constant bent attitude and registration within the groove 17 when the end face 25 of the closure member 20 is urged against the optical fiber 1 in its closed position.

Preferably, a resilient force is used to urge the closure member 20 against the optical fiber 1 and against the surface 14 in groove 17. Preferably the resilient force is provided by a spring so as to maintain a substantially continuous load on the fiber regardless of dynamic changes which may occur over time, such as temperature induced differential material expansions and contractions, material creep due to stress, etc.

Figure 3A:
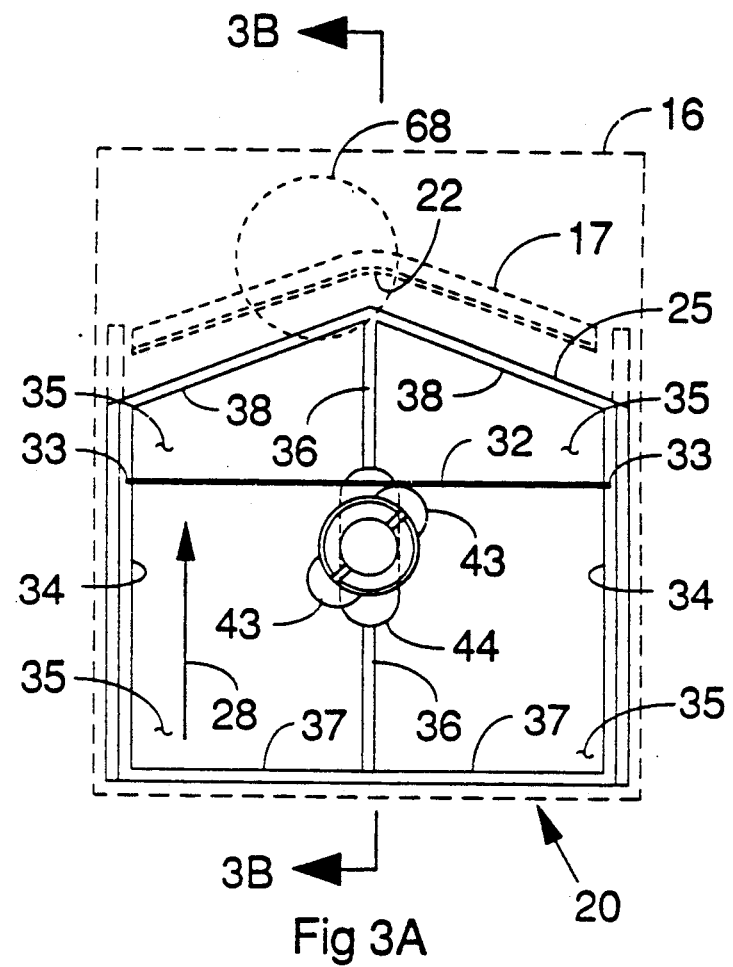
FIG. 3A is a bottom plan view of an adaptation of the closure member depicted in FIG. 3 provided in order to achieve a cammed closure member for releasably pressing the optical fiber.
Figure 3B:
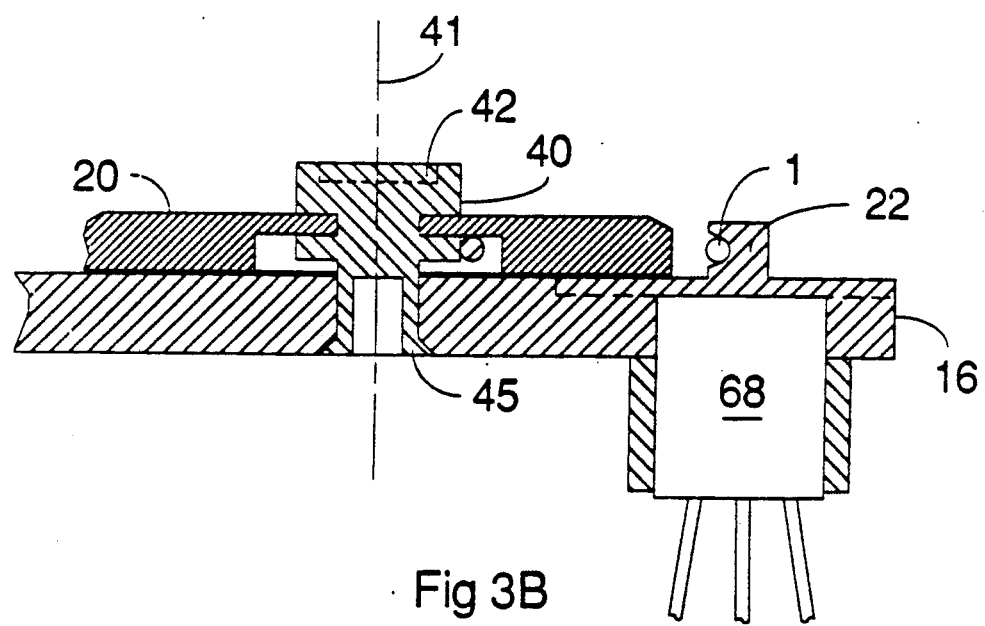
FIG. 3B is a side view in elevation and section of the cammed closure member adaptation as taken along line 3B—3B in FIG. 3.

According to the embodiment of FIGS. 3A and 3B, a bias force 28 is generated by providing the closure member 20 with a transversely mounted leaf spring 32 seated in two oppositely facing notches 33 formed in outer sidewalls 34 of the closure member 20. The leaf spring 32 is placed in a recess 35 formed within the closure member 20. Central longitudinal dependent ribs 36 cooperate with the sidewalls 34 and endwalls 37 and 38 to reinforce the closure member 20.

A rotatable locking pin 40 is seated in a suitable opening defined in the substrate 16 and is rotatable about an axis of rotation denominated by the axis line pointed to by reference numeral 41. A screwdriver groove 42, or e.g. a central hexagonal recess (Allen wrench compatible) may be formed in the top of the pin 40 to enable a craftsperson to rotate the pin with a suitable mating tool (not shown).

The pin 40 is preferably provided with at least one cam portion 43 which engages and causes the leaf spring 32 to become deflected and thereby urge the closure member 20 resiliently against the optical fiber 1 which is in turn forced against the substrate 16 with a bias force selected to be adequate to maintain the optical fiber 1 in proper alignment and registration with respect to the groove 17, and particularly its bent portion 22.

The closure member 20 is formed to define a longitudinal slot 44 which provides a central opening through which the pin 40 freely, yet snugly passes. The slot 44 enables the cam portions 43 of the pin 40 to pass through the closure member 20 in one axial orientation of the pin 40 relative to the closure 20 during assembly of the tap.

A bottom stem portion of the pin 40 is hollow and slotted and is provided with an outwardly extending skirt 45. This skirt 45 seats with a peripheral annular flange formed into the lower face of the substrate 16 at the opening sized and placed to form a journal for and accommodate the pin 40. Slots 46 enable the bottom stem portion of the pin 40 to be sufficiently resilient to pass through the opening in the substrate 16, notwithstanding the presence of the skirt portion 45. Thus, it will be appreciated that the pin 40 snap-locks into the substrate 16 through the closure member 20.

When the optical fiber 1 is disposed in the tap of FIG. 3 and is transmitting light in a direction from right to left in the drawing, light radiates outward from the fiber core, through its cladding, through its outer coating(s), and into the portion 14 of the substrate defining the groove bent portion 22 which functionally acts as an optical coupler 22 so as to facilitate light transfer between the coupler 22 so as to facilitate light transfer between the outer coating of the fiber and the substrate portion 14. If desired, a wetting preferably stable agent, such as a partially cross-linked gel having finite elongation properties, such as an ultimate elongation in excess of 200 or 500% can be used to facilitate optical coupling.

The light entering the optical coupler is deflected by the reflecting surface of the substrate portion 4 out of the plane 24 of the bent portion 2 of the fiber 1 and groove 17 and towards the light element 68 having an end surface 13 entirely disposed out of the plane 24, even though the end surface 13 can be in very close proximity to the bent portion 22. The reflection surface can simply be a smooth surface exposed to air shaped such that the withdrawn light hits the smooth surface at angles such that total internal reflection occurs off this surface with little or no light being refracted therethrough into the air.

Preferably, the smooth surface has a reflective coating thereon as well. It is preferred to form the surface so as to have a reflectance greater than 0.5, preferably greater than 0.6 or 0.7, most preferably greater than 0.8 or 0.85, and optimally greater than 0.9 or 0.95.

Preferably, although not necessarily, the reflection surface 4 is curved in one or preferably two directions so as to optimize focusing between the fiber core and the light element, such as for example being curved along a direction of axis X and Y (e.g. along a line 34 and a line 35) as schematically illustrated in FIG. 1. A parabolic or an elliptical reflector are two preferred embodiments. According to particularly preferred embodiments, the actual shape of the reflecting surface is optimized so that optimum focusing into the optical fiber core or onto a photodetector or the light collecting surface is achieved. To this end, the surface 4 is shaped and positioned such that preferably more than 30% of the light withdrawn for the fiber core is reflected, more preferably more than 40%, 50% or 60%, most preferably more than 70% or 80%.

For light injection, the surface is shaped and positioned such that as much light as possible emitted by the light source is injected into the fiber core as a guided mode, e.g. preferably more than 0.05%, more preferably more than 0.1%, 0.5%, or 1%, most preferably more than 10%, 30% or 40%. Differences in phase-space area between the end surface of the light emitting source and the core of the fiber necessarily result in lower light injection efficiencies than are possible with a similar geometry for withdrawing light.

The present invention produces several new and unexpected advantages. First, as graphically illustrated in FIGS. 1-3, 3A, and 3B, by disposing the light element 6, 8, 68 and its end surface 11, 12, 13 completely out of the plane 24 of the bend, the bend profile of the optical fiber portion 2 may be optimized as desired to achieve optimum optical detection or injection efficiency without being unduly further modified due to a physical size of the light element or its end surface.

Figure 5:
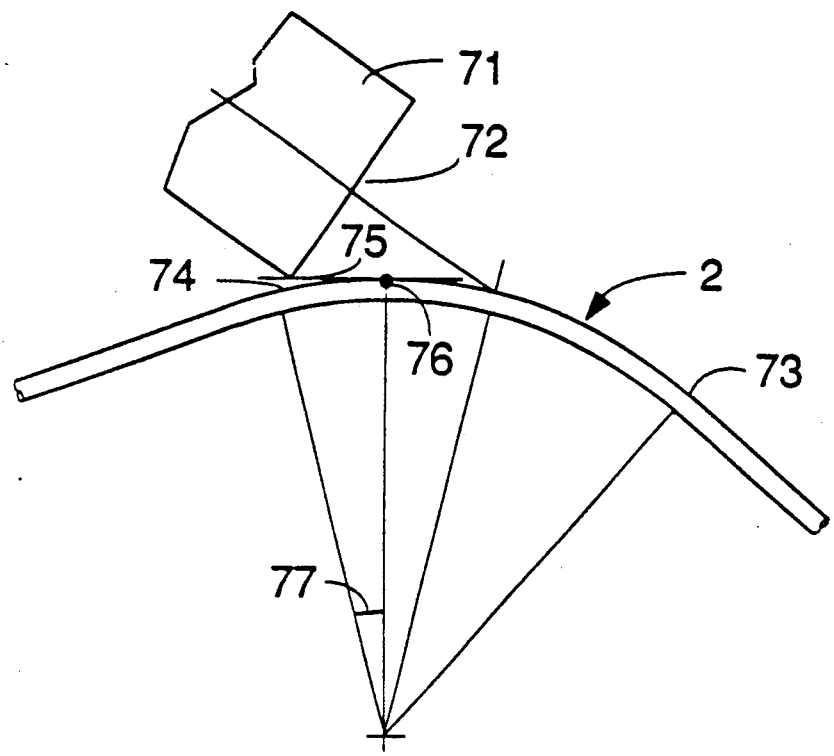
FIG. 5 illustrates a tap geometry whereby an end surface of a light element is disposed in a plane of an optical fiber bend.

This advantage is more clearly illustrated by reference to FIG. 5 where a light element 71 is disposed so that its collection surface 72 is in the plane of the bend, the bend beginning at point 73 and ending at point 74. The difference between the physical size of the light element 71 and the optical fiber 1 including its bent profile 2 requires that the end surface 72 of the light element 71 be disposed an undesirably large distance away from the beginning of the fiber bend 73 which tends to decrease coupling efficiency.

In addition, to allow the fiber 1 to clear a lowermost edge 75 of the end surface 72, the fiber bend portion must necessarily extend past point 76 of the bend so as to include arc 77, which is particularly disadvantageous since very little of the light escaping the fiber within the arc 77 will be collected by the end surface 72. Also, disposing the light element 71 so that its end surface 73 is in the plane of the bend requires that a thickness of a substrate housing the light element must be unduly thick in a region of the substrate which contains a groove for defining the bend profile of the fiber thus complicating manufacturing of the substrate as molding tolerances become difficult to control.

In comparison, with the present invention, the reflection surface 4, 14 may be disposed as close as desired to the bent optical fiber portion 2 and may be made as large and shaped as desired so as to deflect as much light as is required as may be escaping from the fiber or from the light source in order to achieve the highest light coupling efficiency. As mentioned, for highest efficiency light withdrawal, since the end surface of the light collection element is out of the plane 24 of the bend, preferably the bent portion 2 or 22 of the optical fiber is disposed entirely upstream of the reflection surface 4. For highest efficiency light injection the bent portion is disposed entirely downstream of the reflection surface 14.

Figure 3C:
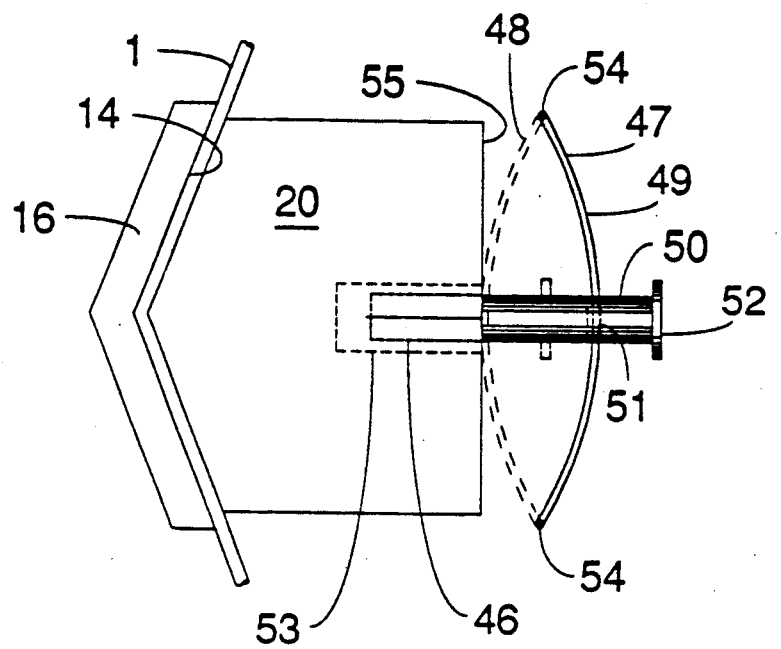
FIG. 3C is a plan view of a closure member resiliently and releasably pressed against an optical fiber by utilizing a snap-action spring.

FIG. 3C illustrates another preferred embodiment of the invention. Referring to this figure, the closure member 20 is resiliently urged against the optical fiber 1 which is then urged against the surface 14 or 30 (FIG. 4) by a snap-action spring 49. The snap-action spring is essentially a leaf spring having its opposite ends secured at points 54 such that the spring is normally maintained in compression so as to normally bow either outwards or inwards. The spring 49 is disposed through an aperture 51 within a pusher 50. When the pusher 50 is moved to the left in the drawing the snap-action spring is urged from its open position 47 where it bows to the right to its closed position 48 where it bows to the left as illustrated by the dotted lines in the drawing with the result that the snapaction spring 49 contacts a portion of the closure member 20, e.g. its end face 55, thus urging it to the left in the drawing and against the fiber 1 so as to provide a resilient spring force thereagainst. The pusher 50 can be designed such that its end 46 does not contact the closure member face 55 by providing an aperture 53 within the closure member if necessary so that it is not the pusher 50 which maintains a nonresilient pressure on the closure member 20 but rather the spring 49 which maintains a resilient pressure on the closure member.

Figure 4:
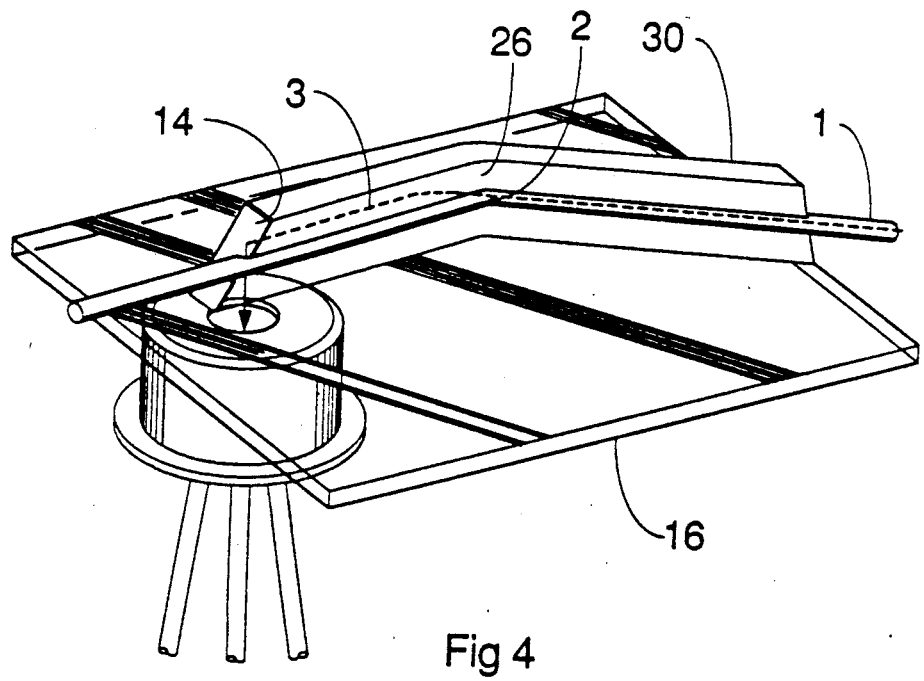
FIG. 4 illustrates an alternative embodiment which includes a waveguide for transmitting light to and from an optical fiber core.

According to all embodiments, preferably the groove 17 is formed in a substrate, e.g. surface 14, waveguide 30, etc., so as to define a continuous and constant bend profile path for the optical fiber 1 such that upon resiliently maintained under pressure within the groove 17 the bend profile of the optical fiber is well maintained and held essentially constant. Accordingly, differences in fiber strength should have minimal impact on the exact profile the intermediate portion of the optical fiber maintains. To this end, any discontinuity in the groove 17, as illustrated in FIG. 3, should preferably be downstream from the precise location within the groove 17 where the fiber bend is to occur so that the fiber bend profile is not significantly affected by any gap in the groove 17. Such results in stable in operation of the tap. In the embodiment of FIG. 4, since no gap is provided in the groove, obviously a continuous and well defined optical fiber intermediate portion bend profile is easily maintained.

Figure 3D:
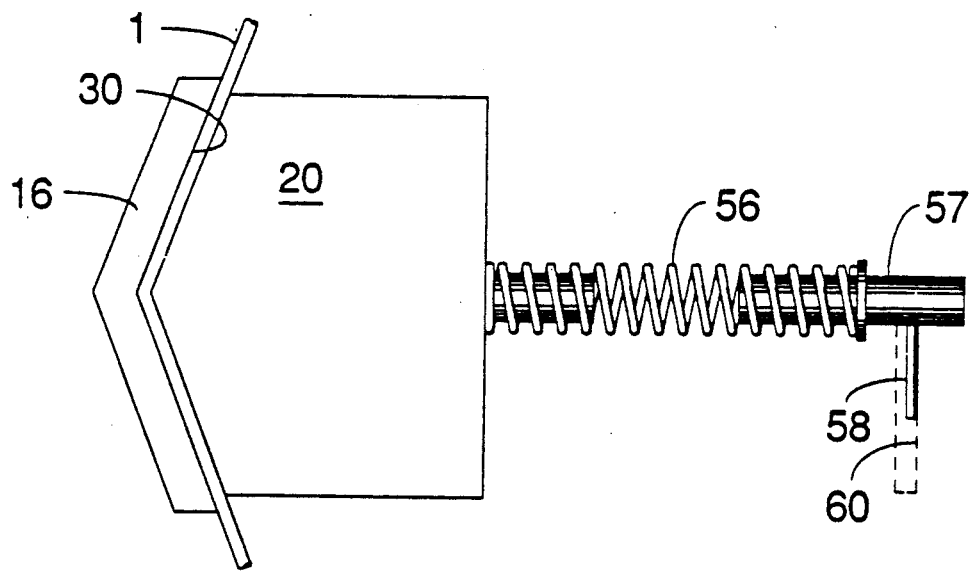
FIG. 3D is a plan view of a closure member resiliently and releasably urged by a coil spring having a bayonet locking pin.

FIG. 3D illustrates an alternate preferred embodiment of the invention whereby a resilient force is provided by a coil spring 56. In this embodiment, the closure member 20 is resiliently urged against the fiber 1 by compressing the coil spring 56 by moving its pusher 57 to the left in the drawing, and subsequent to exerting a desired force on the closure member, the pusher 57 is simply rotated about any appropriate angle about its longitudinal axis, such as 90°, whereby locking bayonet pin 58 engages a corresponding mating bayonet slot 60 in a body which is moveable relative to the closure member 20, such as the substrate 16.

Figure 3E:
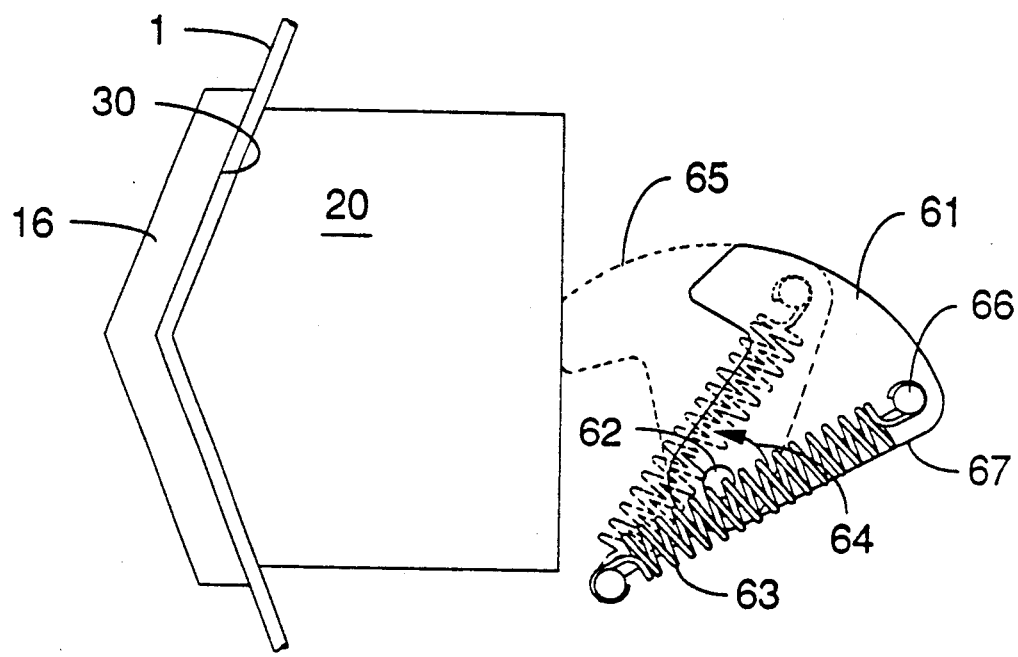
FIG. 3E is a plan view of a closure member resiliently and releasably urged by a 2-position pivot member which maintains a spring in tension.

FIG. 3E illustrates yet another preferred embodiment of the invention whereby a resilient urging force is provided by the use of a pivot member 61 pivoted about a pivot pin 62 to which is secured a tension spring 63 by spring connections 66. As illustrated by the solid lines in the drawing, in the open position the spring 63 is disposed to the right of the pin 62. To provide the resilient urging force to the closure member 20, the member 61 is pivoted about the pin 62 in a counterclockwise direction in the embodiment illustrated such that the spring 63 is initially stretched to a maximum when the pins 66 are collinear with the pivot pin 62, and thereafter upon further rotation of the pivot member 61 in the counterclockwise direction the tension spring 63 is allowed to relax so as to further urge the pivot member 61 against the closure member 20 and to provide the resilient spring force thereagainst, as desired.

FIG. 4 illustrates another preferred embodiment of the present invention. In this embodiment, the light 3 withdrawn from the optical fiber 1 at the bent portion 2 is confined within a waveguide 30 which forms part of the substrate 16 and forms the bend profile 26 for the bent optical fiber portion 2, with the reflection surface 14 being disposed at an end of the waveguide 30.

Figure 6:
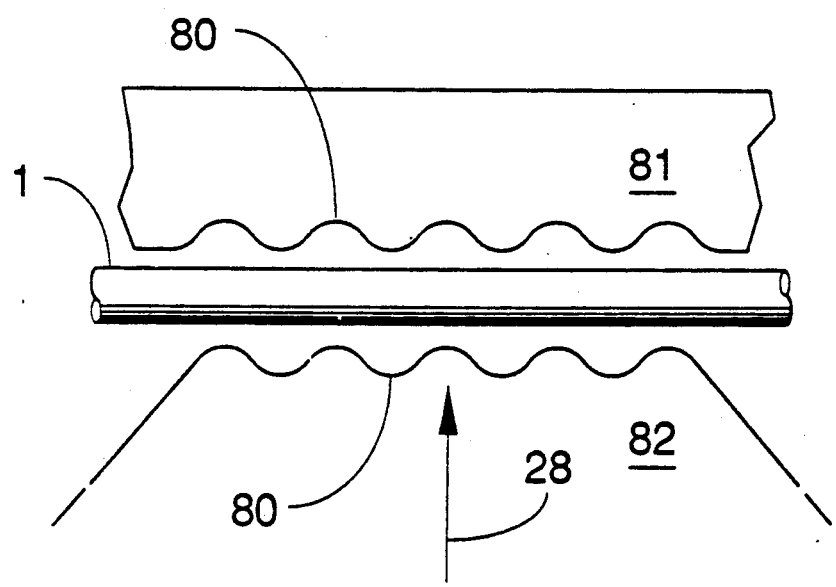
FIG. 6 illustrates another preferred embodiment invention which utilizes a series of microbends for bending an optical fiber.

FIG. 6 illustrates yet a further embodiment of the invention wherein both coupling in or out of the optical fiber 1 is accomplished by utilizing a series of complementary microbend surfaces 80 between first and second substrates, the optical fiber 1 being disposed between the first and second substrates by a resilient force denoted by the arrow 28. In this embodiment, it is preferable for one of the members 81, 82 to have a reflective surface on the portion thereof forming the microbend surface so that light is preferentially coupled through the other member which is transparent, with the reflecting surface of the invention being disposed on that other member.

As used throughout this specification, the term "microbend" means any kind of bend profile whereby an amplitude of the bend is less than two diameters of the fiber cladding, and is typically of the order of 10 to 20% of the diameter of the outer cladding of the fiber 1. By "macrobend" is meant as any bend having an amplitude greater than twice the diameter of the outer cladding of the fiber.

Figure 7:
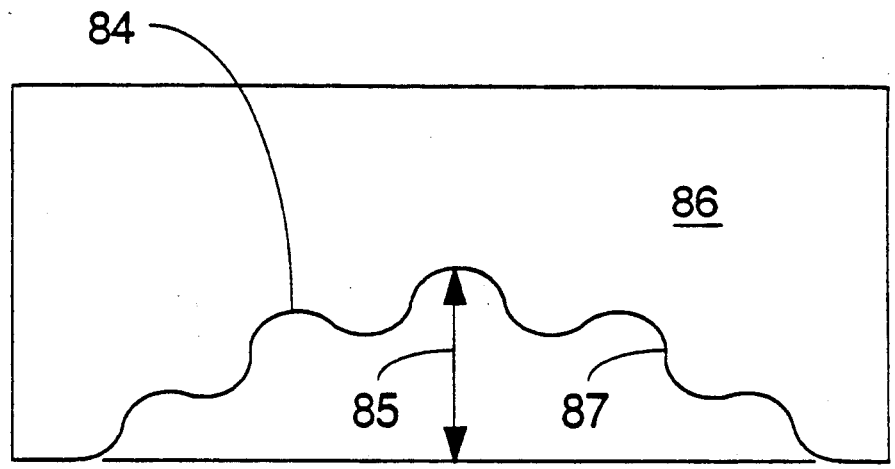
FIG. 7 illustrates yet a further embodiment whereby a macrobend includes a series of microbends therein for bending an optical fiber.

FIG. 7 illustrates yet a further embodiment of the present invention wherein a substrate 86 has formed therein a microbend having an amplitude equal to the height 85; and, within the surface of the macrobend a series of microbends are formed, with the reflecting surface being formed at an appropriate place within the substrate 86. A member having a curved reflective surface shaped complementary to the bend 84 so as to maintain the optical fiber appropriately bent is not shown but is required in operation.

Figure 8:
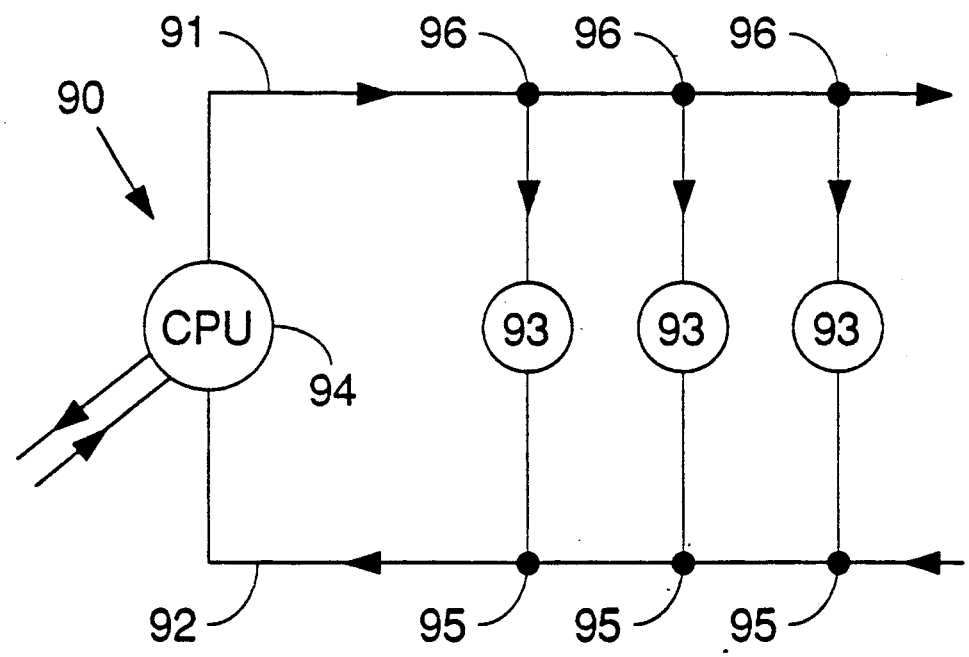
FIG. 8 illustrates one preferred embodiment of a network employing taps of the present invention.

FIG. 8 illustrates one practical embodiment for using taps having reflecting surfaces as described herein, FIG. 8 illustrating an optical fiber network 90 having first and second bus fibers 91, 92 interconnecting a plurality of terminals 93 in a bus architecture. The optical fiber 91 constitutes a read optical fiber, and the optical fiber 92 constitutes a write optical fiber The network 90 so formed is controlled by a CPU or central processing unit 94.

According to the present invention, the light is withdrawn from the read optical fiber 91 in a serial manner by using a plurality of read taps disposed in series and constructed according to any combination of the embodiments described above with the terminals 93 writing onto the write bus 92 via a plurality of taps 95 disposed in series and constructed in accordance with any of the tap embodiments described hereinabove. Preferably, signals going to any one or more of the terminals 93 are multiplexed in time rather than being controlled by a token passing algorithm. According to a particularly preferred embodiment, any one or more of the terminals 93 is connected to one or more telephones, personal computers, mainframe computers, or similar data assembling, processing and generating equipment.

The present invention is useful for tapping both single mode and multimode fiber, including both step index and graded index, and is usable with both glass-on-glass and plastic clad silica fiber. According to a presently preferred embodiment, the invention includes the use of glass-on-glass fiber including a polymeric coating (e.g. buffer), the coating preferably having an index of refraction higher than the cladding. Examples include an acrylate or silicone buffer, and/or any thin additional layers (e.g. jackets) surrounding the buffer layer Typical preferred glass-on-glass fibers include single mode fibers having a core diameter of about 10 microns, and a cladding diameter of about 125 microns, and a buffer diameter in a range between about 250–500 microns, with multimode glass-on-glass fiber including a core/cladding diameter of roughly 50/125 microns, 100/140 microns, and 85/125 microns, for example. Preferred fibers include those having cylindrical cores, cylindrical claddings and cylindrical coatings (e.g. buffers and/or jackets). Preferably, at least the buffer layer is maintained intact so as not to detrimentally degrade the strength of the fiber by exposing a glass surface thereof to moisture.

Although the invention has been described by reference to certain preferred embodiments thereof, it is not to be limited thereby and is to be limited only by the appended claims.

We claim:

1. A tap for coupling light between an intermediate portion of an optical fiber and a light element, comprising:
   a light element located adjacent an intermediate portion of an optical fiber;
   a closure member;
   a substrate having a fiber positioning groove therein,
   means for moving the closure member relative to the substrate groove between an open position whereat the intermediate portion of the optical fiber can be loaded adjacent the groove and a closed position whereat the optical fiber intermediate portion is bent and resiliently clamped between the substrate groove and the closure member so as to allow light coupling between a core of the fiber and the light element;
   a spring for resiliently urging the closure member and the substrate groove together when in their closed position, the spring having ends secured to one of the closure member and the substrate;
   a rotatable cam having first and second positions, the first position corresponding to the open position of the closure member and the substrate groove, the second position corresponding to the closed position of the closure member and the substrate groove, the cam in its second position urging an intermediate section of the spring against one of the substrate and the closure member so as to cause the substrate groove and closure member to be resiliently urged together.

2. The tap of claim 1, the rotatable cam comprising a locking pin journaled in a suitable opening define din the substrate and the closure member and being rotatable about an axis of rotation, the locking pin including at least one cam for engaging the spring intermediate portion thereby to cause the spring to become deflected and thereby urge the closure member resiliently against the optical fiber with a bias force selected to maintain the bend portion of the optical fiber in alignment and registration with an optical fiber located between the fiber intermediate portion and the light element.

3. The tap of claim 2, the closure member having a longitudinal slot providing a central opening through which the pin freely passes, thereby to enable the cam portion to pass through the closure member during fabrication and to permit the closure member to move slideably along its locus of movement relative to the substrate when the cam portion of the pin engages the spring as the pin is rotated.

4. The tap of claim 2, the pin defining a rotating hand tool engagement means for enabling a hand tool to engage the pin thereby facilitating its rotation and consequent movement of the closure member along its locus of movement relative to the substrate means.

5. The tap of claim 2, the pin including a bottom stem portion defining a hollow central portion and having a slotted, outwardly extending skirt, the substrate including a peripheral annular flange formed into the lower face thereof, the hollow central portion of the pin thereby being adapted to snap-lock to the substrate means thereby to provide the journal for rotation of the pin relative to the substrate means.

6. The tap of claim 2, the closure member having an end face with a profile which is complementary with a profile of the optical coupler such that the optical fiber may be securely maintained in a constant bend attitude and registration at the optical coupler when the end face of the closure member is urged against the optical fiber.

7. The tap of claim 2, the spring comprising a leaf spring seeded into oppositely facing notches formed in outer sidewalls of the closure member, the leaf spring being placed in a recess formed within the closure member.

8. A tap for coupling light between an intermediate portion of an optical fiber and a light element, comprising:
   a light element located adjacent an intermediate portion of an optical fiber;
   a closure member;
   a substrate having a fiber positioning groove therein, means for moving the closure member to the substrate groove between an open position whereat the intermediate portion of the optical fiber can be loaded adjacent the groove and a closed position whereat the optical fiber intermediate portion is bent and resiliently clamped between the substrate groove and the closure member so as to allow light coupling between a core of the fiber and the light element;

a spring for resiliently urging the closure member and the substrate groove together when in their closed position, the spring having ends secured to a body, the closure member being moveable relative to the body, the spring being secured so as to normally being a first or second position, the first position corresponding to the open position of the closure member and the substrate groove, the second position corresponding to the closed position of the closure member and the substrate groove; and means for deflecting the spring between its first and second positions.

9. The tap of claim 8, further comprising a pusher having an aperture through which an intermediate section of the spring resides.

10. The tap of claim 9, the pusher being designed so as not to contact the closure member when the spring is in its first position and second position.

11. A tap for coupling light between an intermediate portion of an optical fiber and a light element, comprising:

a light element located adjacent an intermediate portion of an optical fiber;

a closure member;

a substrate having a fiber positioning groove therein, means for moving the closure member to the substrate groove between an open position whereat the intermediate portion of the optical fiber can be loaded adjacent the groove and a closed position whereat the optical fiber intermediate portion is bent and resiliently clamped between the substrate groove and the closure member so as to allow light coupling between a core of the fiber and the light element;

a spring for resiliently urging the closure member and the substrate groove together when in their closed position, the spring having one end secured to the closure member;

a pusher connected to a second opposite end of the spring, the sprig normally maintaining the closure member and the substrate groove in their open position, the pusher including means for being locked to a body moveable relative to the closure member, whereby upon movement of the pusher so as to compress the spring the closure member and substrate groove are resiliently urged into their closed position.

12. The tap of claim 11, the spring comprising a coil spring, the body including means for accommodating the locking means of the pusher so as to maintain the coil spring in its compressed state when the closure member and substrate groove are in their closed position.

13. A tap for coupling light between an intermediate portion of an optical fiber and a light element, comprising:

a light element located adjacent an intermediate portion of an optical fiber;

a closure member;

a substrate having a fiber positioning groove therein, means for moving the closure member to the substrate groove between an open position whereat the intermediate portion of the optical fiber can be loaded adjacent the groove and a closed position whereat the optical fiber intermediate portion is bent and resiliently clamped between the substrate groove and the closure member so as to allow light coupling between a core of the fiber and the light element;

a pivot member rotatably secured to a body which is moveable relative to the closure member abut a pivot point; a spring having one end connected to the pivot member and a second end connected to the body, the spring normally being in tension;

whereby the pivot member is moveable between first and second positions, its first position corresponding to the open position of the closure member and the substrate groove, its second position corresponding to the close position of the closure member and the substrate groove, a straight line interconnected the connected ends of the tension spring being on one side of the pivot pin when the pivot member is in its first position and being on an opposite side of the pivot pin when the pivot member is in its closed position, the pivot member resiliently urging the closure member against the substrate groove when in its second position.

* * * * *